United States Patent [19]
Matsui

[11] Patent Number: 5,907,439
[45] Date of Patent: May 25, 1999

[54] ZOOM LENS APPARATUS WITH SHARED CAM GROOVE

[76] Inventor: Nobuo Matsui, 1-324 Uetake-cho, Omiya-shi, Saitama, Japan

[21] Appl. No.: 08/966,711

[22] Filed: Nov. 10, 1997

[30] Foreign Application Priority Data

Nov. 11, 1996 [JP] Japan .................................. 8-298728

[51] Int. Cl.⁶ .............................. G02B 15/14; G02B 7/10
[52] U.S. Cl. ........................ 359/700; 359/676; 359/689; 359/695; 359/699; 396/72; 396/379; 396/382; 352/139; 352/140
[58] Field of Search ..................... 359/676, 680, 359/689, 694, 695, 699, 700, 703, 704; 396/72, 75, 79, 82, 83, 84, 87, 349, 379, 382; 352/139, 140

[56] References Cited

U.S. PATENT DOCUMENTS

| | | | |
|---|---|---|---|
| 4,054,372 | 10/1977 | Schroeder | 350/186 |
| 4,627,691 | 12/1986 | Tomori | 350/429 |
| 5,144,490 | 9/1992 | Yamanouchi | 359/694 |
| 5,712,734 | 1/1998 | Kanno | 359/701 |

*Primary Examiner*—Georgia Epps
*Assistant Examiner*—David N. Spector
*Attorney, Agent, or Firm*—Birch, Stewart, Kolasch & Birch, LLP

[57] ABSTRACT

Two cam pins of the variable magnification lens group and the aberration correction lens group are guided by two side walls of one cam groove. Thus, two cam grooves can deal with three movable lens groups, and there is no need to provide three cam grooves. Consequently, the cam cylinder can be short, and thereby the zoom lens apparatus can be compact. A spring applies force to the two cam pins to separate from one another, so that the cam pins can be pressed against the side walls.

8 Claims, 4 Drawing Sheets

ZOOM LENS APPARATUS WITH SHARED CAM GROOVE

BACKGROUND OF THE INVENTION

1. Field of the Invention

The present invention relates generally to a zoom lens apparatus, and more particularly to a zoom lens apparatus which is provided with a variable magnification lens group, an aberration correction lens group and a focus correction lens group.

2. Description of Related Art

A conventional zoom lens apparatus zooms an image by means of two movable lens groups including a variable magnification lens group and a focus correction lens group. The zooming performance has been recently improved by three movable lens groups further including an aberration correction lens group.

A cam cylinder (a cam member) is rotatably arranged on the lens barrel of the above-mentioned zoom lens apparatus. Three cam grooves are formed on the cam cylinder, and each cam groove is engaged with a cam pin (follower) provided in each movable lens group. The cam pins stick out through the cam grooves, and engage with straight grooves formed on a fixed cylinder, which is arranged on the periphery of the cam cylinder. Thus, when the cam cylinder is rotated, the variable magnification lens group, the aberration correction lens group and the focus correction lens group separately move both forward and backward along the optical axis due to the operation of the cam pins, the cam grooves and the straight grooves.

The conventional zoom lens apparatus, however, is provided with three cam grooves, which are formed on the cam cylinder, and thus, the cam cylinder is long and the zoom lens apparatus is large in size.

SUMMARY OF THE INVENTION

The present invention has been developed in view of the above-described circumstances, and has as its object the provision of a zoom lens apparatus which has a short cam cylinder to thereby make the zoom lens apparatus compact.

To achieve the above-mentioned object, a zoom lens apparatus of the present invention comprises: movable lens groups being arranged in a lens barrel in a manner to be separately movable both forward and backward along an optical axis, the movable lens groups including a variable magnification lens group, an aberration correction lens group and a focus correction lens group; followers respectively provided in the movable lens groups; a cam member, having cam grooves engaged with the followers, for separately moving the followers along the cam grooves so as to separately move the movable lens groups along the optical axis, two of the followers moving along two side walls of one of the cam grooves; and a pressing member for pressing the two followers against the two side walls of the one cam groove.

According to the present invention, two side walls of one of cam grooves are used as cam walls, each of which functions as a cam groove for guiding a cam pin. Thereby, two cam pins of two movable lens groups can be moved by the cam walls of the one cam groove. Thus, two cam grooves can deal with three movable lens groups, and there is no need to provide three cam grooves. Consequently, the cam cylinder can be short, and thereby the zoom lens apparatus can be compact.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

This invention will hereunder be described in further detail with reference to the accompanying drawings.

Figure 1:
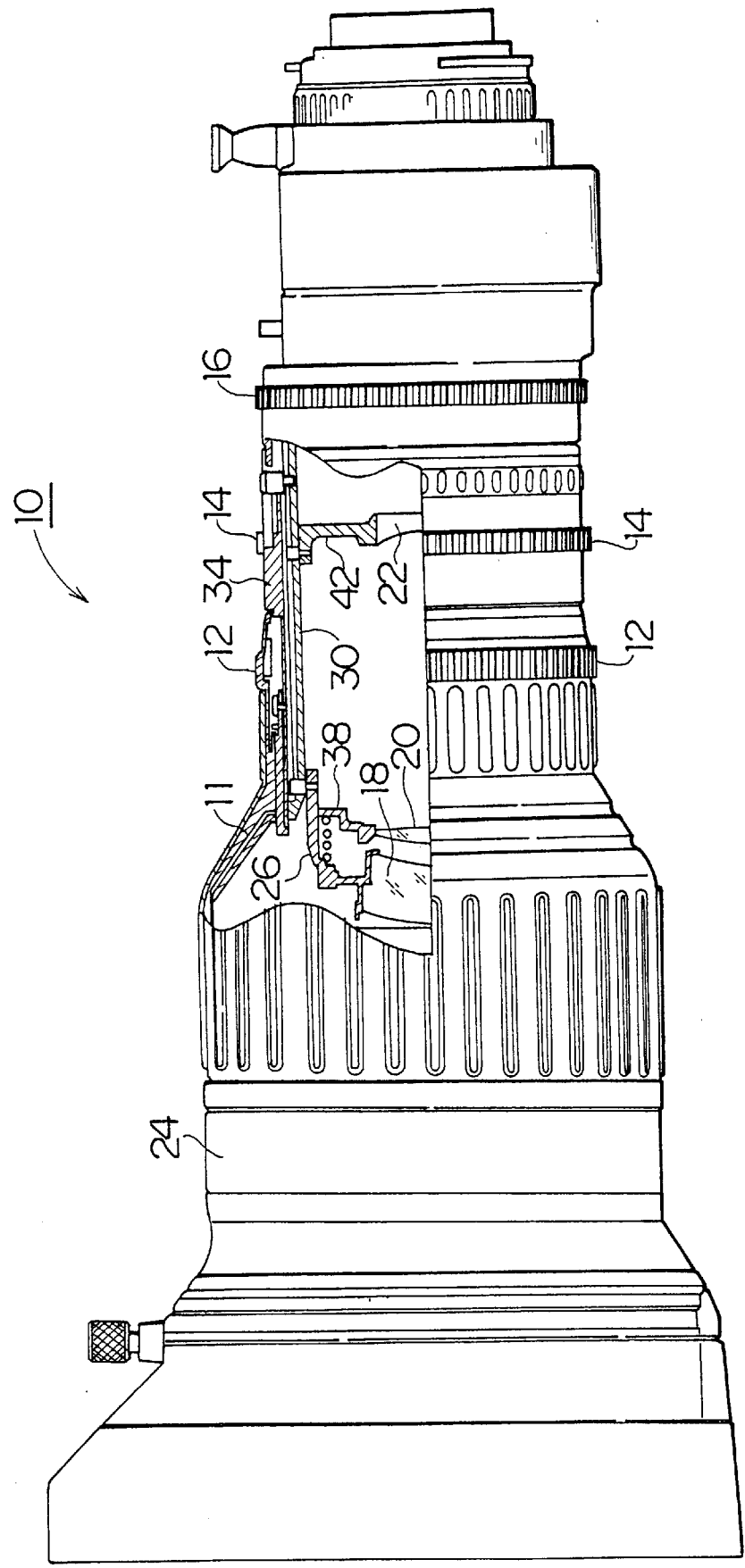
FIG. 1 is a side view of a zoom lens apparatus which a zoom lens apparatus of the present invention applies to, for an ENG camera.

FIG. 1 is a side view of a TV lens according to the present invention for an electronic news gathering (ENG) camera, and it partially illustrates the inner structure of the TV lens. A lens barrel 10 of the TV lens is provided with a focus ring 12, a zoom ring 14 and an iris ring 16. In the lens barrel 10, a focus lens group (not shown), a variable magnification lens group 18, an aberration correction lens group 20, a focus correction lens group 22, an iris (not shown) and a relay lens (not shown) are arranged in order from the left side in FIG. 1.

The focus lens group is mounted in a focus lens barrel 24, which is integrated with the focus ring 12, and the focus lens barrel 24 is mounted in the body 11 of the lens barrel 10 with a helicoid mechanism in a manner to be movable forward and backward. When the focus ring 12 (that is, the focus lens barrel 24) is turned, the focus lens group is moved both forward and backward so that the focus can be adjusted.

Figure 2:
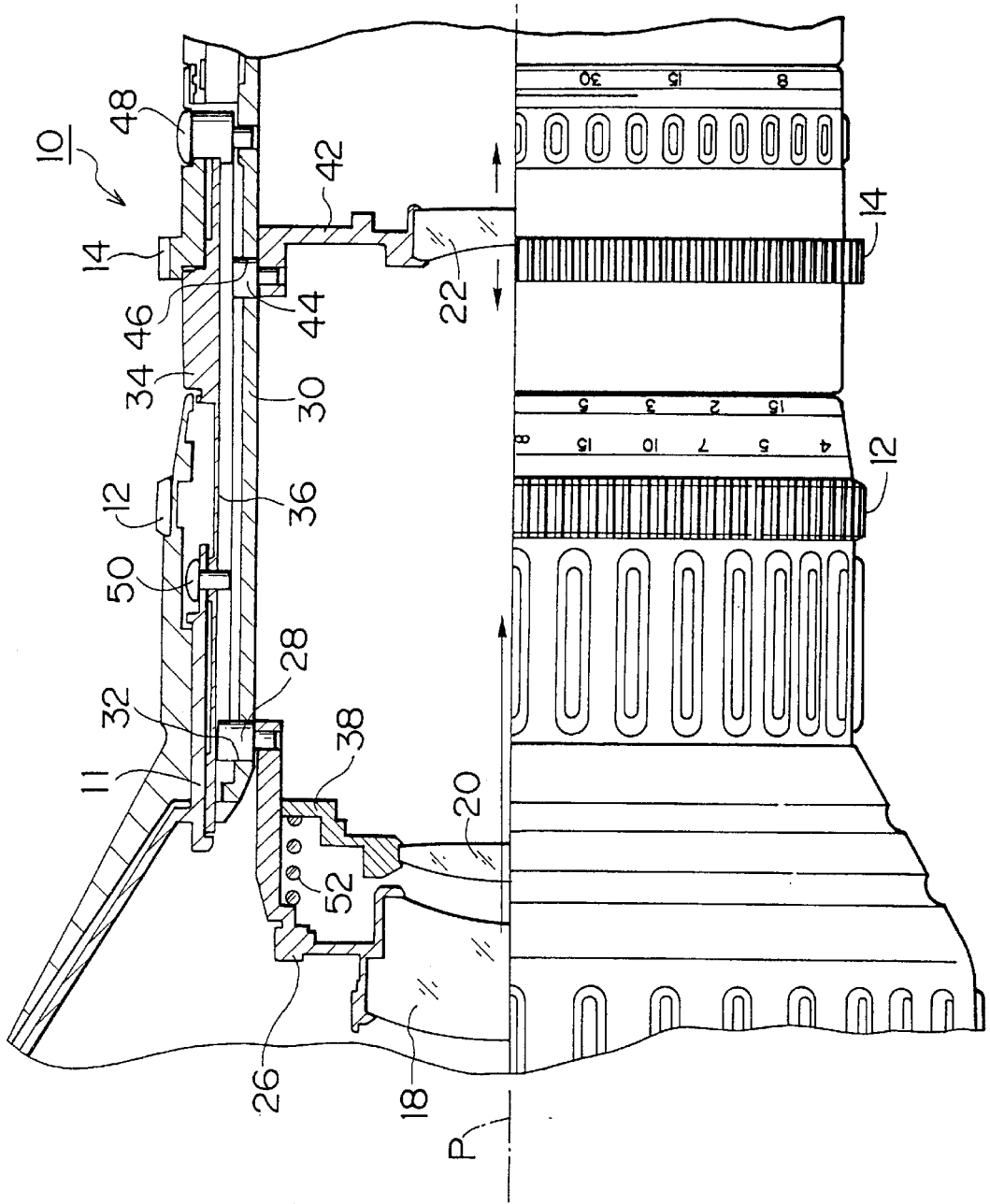
FIG. 2 is a semi sectional view of the essential parts of the zoom lens apparatus shown in FIG. 1.

The variable magnification lens group 18 is mounted in a lens support frame 26 as shown in FIG. 2. A cam pin 28 projecting from the lens support frame 26 engages with a cam groove 32 formed on a zoom cam cylinder 30. The top end of the cam pin 28 sticks out through the cam groove 32 and engages with a straight groove 36 formed on a fixed cylinder 34.

The aberration correction lens group 20 is mounted in a lens support frame 38. A cam pin 40 (see FIG. 3) projecting from the lens support frame 38 engages with the cam groove 32 of the zoom cam cylinder 30. The top end of the cam pin 40 sticks out through the cam groove 32 and engages with a straight groove 37 (see FIG. 4) formed on the fixed cylinder 34.

The focus correction lens group 22 is mounted in a lens support frame 42. A cam pin 44 projecting from the lens support frame 42 engages with a cam groove 46 formed on the cam cylinder 30. The top end of the cam pin 44 sticks out through the cam groove 46 and engages with a straight groove (not shown) formed on the fixed cylinder 34.

The zoom cam cylinder 30 is rotatably arranged in the lens barrel 10, and the fixed cylinder 34 is fixed to the body 11 of the lens barrel 10 with a pin 50. The zoom cam cylinder 30 and the zoom ring 14 are linked together with a pin 48.

When the zoom ring 14 is turned, the zoom cam cylinder 30 is turned with the zoom ring 14. Thereby, the variable magnification lens group 18 moves both forward and backward along the optical axis P due to the operation of the cam pin 28, the cam groove 32 and the straight groove 36.

Moreover, the aberration correction lens group 20 moves both forward and backward along the optical axis P due to the operation of the cam pin 40, the cam groove 32 and the straight groove 37. Furthermore, the focus correction lens group 22 moves both forward and backward along the optical axis P due to the operation of the cam pin 44, the cam groove 46 and the straight groove (not shown). Thus, the focus is adjusted.

Figure 3:
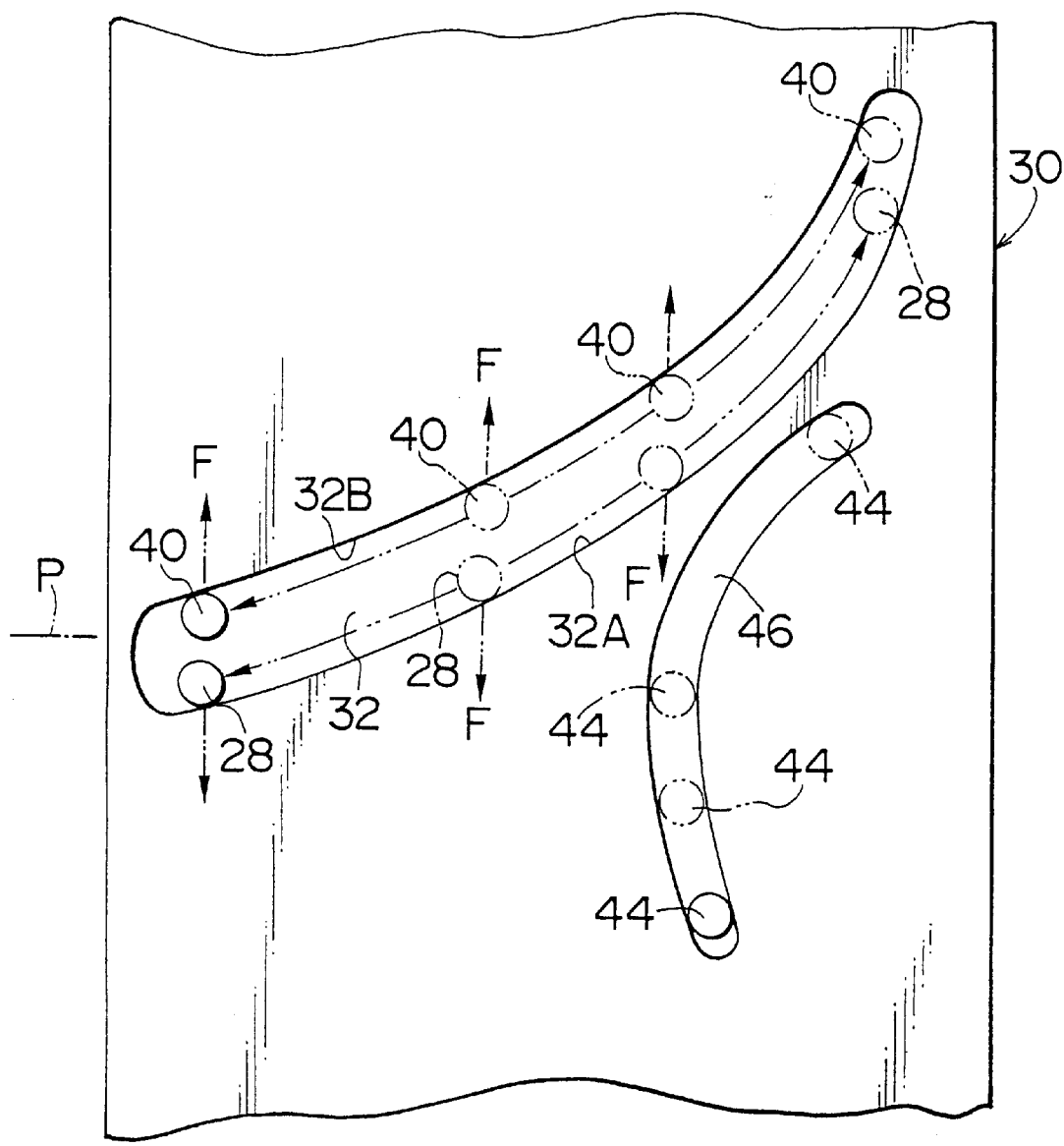
FIG. 3 is a development view illustrating a cam cylinder of the zoom lens apparatus shown in FIG. 1.

As shown in FIG. 3, the cam pin 28 of the variable magnification lens group 18 abuts against a side wall 32A of the cam groove 32, and the cam pin 40 of the aberration correction lens group 20 abuts against the other side wall 32B of the cam groove 32. The cam pins 28 and 40 are pressed to separate from one another by force F of a spring 52, which is arranged between the lens support frames 26 and 38 as shown in FIG. 2. Thus, the cam pin 28 is pressed against the side wall 32A of the cam groove 32 and moves along the side wall 32A. The cam pin 40 is pressed against the side wall 32B of the cam groove 32 and moves along the side wall 32B.

According to the zoom lens apparatus which is constructed in the above-mentioned manner, two side walls 32A and 32B of the cam groove 32 guide the variable magnification lens group 18 and the aberration correction lens group 20, which have almost same manners of moving. Thus, the zoom cam cylinder 30 has only two cam grooves 32 and 46 for guiding three movable lens groups 18, 20 and 22. Consequently, compared to the conventional zoom cam cylinder in which three cam grooves are formed for three movable lens groups, the zoom cam cylinder 30 can be short, and thereby the zoom lens apparatus can be compact in this embodiment.

Since the cam pins 28 and 40 are pressed against the side walls 32A and 32B of the cam groove 32 by the spring 52, the variable magnification lens group 18 and the aberration correction lens group 20 can move smoothly.

Figure 4:
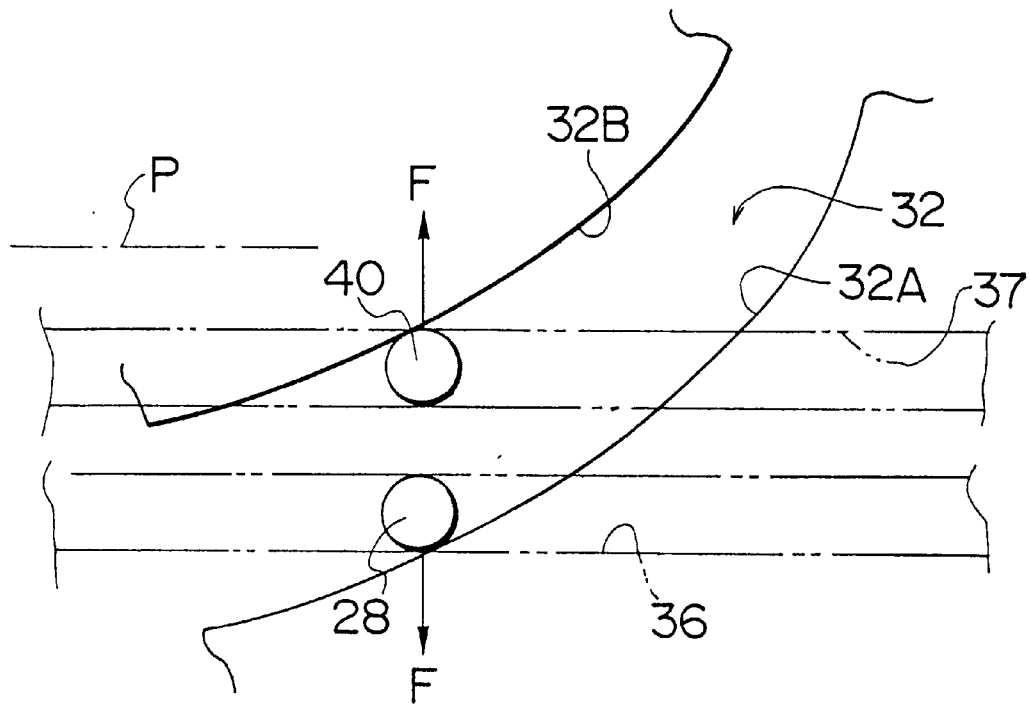
FIG. 4 is a view showing an arrangement of cam pins which require two straight grooves.
Figure 5:
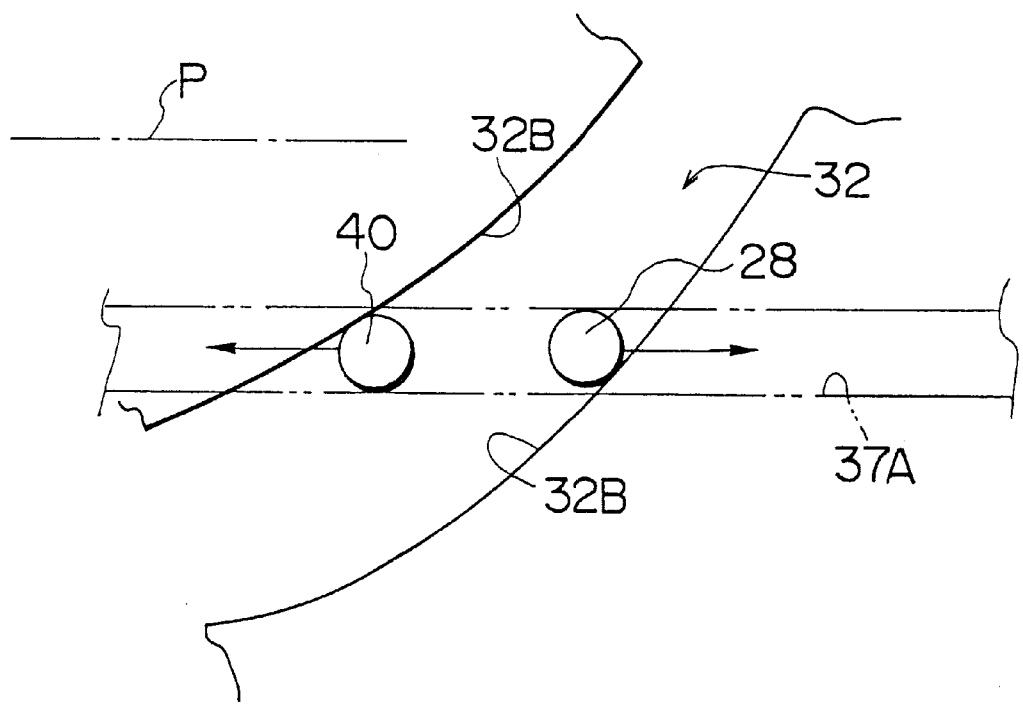
FIG. 5 is a view showing an arrangement of cam pins which use only one straight groove.

In this embodiment, the cam pins 28 and 40 are arranged so that a line connecting the cam pins 28 and 40 is perpendicular to the optical axis P as shown in FIG. 4. Thus, two straight grooves 36 and 37 of the fixed cylinder 34 are provided for guiding the cam pins 28 and 40. On the other hand, if the cam pins 28 and 40 are arranged so that the line connecting the cam pins 28 and 40 is parallel to the optical axis P as shown in FIG. 5, one straight groove 37A, which is formed on the fixed cylinder 34, can guide both cam pins 28 and 40. Thus, the fixed cylinder 34 can be easily manufactured.

In this embodiment, the cam cylinder is used as the cam member, but the present invention should not be restricted to this. A cam roller (a cam rod), in which cam grooves are formed on a peripheral surface thereof, and a cam plate, in which cam grooves are formed on a surface thereof, may be used as the cam member.

In this embodiment, the magnification lens group 18 and the aberration correction lens group 20 are guided by the side walls 32A and 32B of the cam groove 32, but the present invention should not be restricted to this. The aberration correction lens group 20 and the focus correction lens group 22 may be guided by two side walls of one cam groove, or the variable magnification lens group 18 and the focus correction lens group 22 may be guided by two side walls of one cam groove.

In this embodiment, the present invention is applied to the zoom lens apparatus of the TV lens for the ENG camera; however, the present invention may also be applied to another zoom lens apparatus such as a zoom lens apparatus of a TV lens for an electronic field production (EFP) camera.

As set forth hereinabove, according to the zoom lens apparatus of the present invention, the variable magnification lens group and the aberration correction lens group are guided by two side walls of one cam groove, and then only two cam grooves are formed on the cam cylinder. Thus, the cam cylinder can be short, and thereby the zoom lens apparatus can be compact.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A zoom lens apparatus comprising:

movable lens groups being arranged in a lens barrel in a manner to be separately movable both forward and backward along an optical axis, said movable lens groups including a variable magnification lens group, an aberration correction lens group and a focus correction lens group;

followers respectively provided in said movable lens groups;

a cam member, having cam grooves engaged with said followers, for separately moving said followers along said cam grooves so as to separately move said movable lens groups along the optical axis, two of said followers moving along two side walls of one of said cam grooves; and a pressing member for pressing said two followers against said two side walls of said one cam groove.

2. The zoom lens apparatus as defined in claim 1, wherein said two followers are respectively included in said variable magnification lens group and said aberration correction lens group.

3. The zoom lens apparatus as defined in claim 1, wherein said two followers are respectively included in said aberration correction lens group and said focus correction lens group.

4. The zoom lens apparatus as defined in claim 1, wherein said two followers are respectively included in said variable magnification lens group and said focus correction lens group.

5. The zoom lens apparatus as defined in claim 1, wherein said cam member is a cylinder member in which said cam grooves are formed on a wall thereof.

6. The zoom lens apparatus as defined in claim 1, wherein said cam member is a rod member in which said cam grooves are formed on a peripheral surface thereof.

7. The zoom lens apparatus as defined in claim 1, wherein said cam member is a plate member in which said cam grooves are formed on a surface thereof.

8. The zoom lens apparatus as defined in claim 1, wherein said two followers are arranged so that a line connecting said two followers is parallel to the optical axis.

* * * * *

UNITED STATES PATENT AND TRADEMARK OFFICE
CERTIFICATE OF CORRECTION

PATENT NO. : 5,907,439
DATED : May 25, 1999
INVENTOR(S) : Nobuo Matsui

It is certified that error appears in the above-identified patent and that said Letters Patent is hereby corrected as shown below:

On the title page, add

-- [73] Assignee: Fuji Photo Optical Co., Ltd.
Saitama, Japan --

Signed and Sealed this

Twenty-second Day of August, 2000

Attest:

Q. TODD DICKINSON

*Attesting Officer*    *Director of Patents and Trademarks*